(12) United States Patent
Shi

(10) Patent No.: US 9,910,900 B2
(45) Date of Patent: Mar. 6, 2018

(54) METHOD AND APPARATUS FOR PROVIDING SEARCH RESULT

(71) Applicant: BAIDU ONLINE NETWORK TECHNOLOGY (BEIJING) CO., LTD., Beijing (CN)

(72) Inventor: Mengchen Shi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 257 days.

(21) Appl. No.: 14/547,020

(22) Filed: Nov. 18, 2014

(65) Prior Publication Data

US 2015/0261834 A1 Sep. 17, 2015

(30) Foreign Application Priority Data

Mar. 11, 2014 (CN) .......................... 2014 1 0088283

(51) Int. Cl.
  *G06F 7/00* (2006.01)
  *G06F 17/30* (2006.01)
  (Continued)

(52) U.S. Cl.
  CPC ...... *G06F 17/30554* (2013.01); *G06F 3/0482* (2013.01); *G06F 3/0483* (2013.01);
  (Continued)

(58) Field of Classification Search
  USPC ....... 707/722, 726, 634, 710, 716, 721, 723, 707/758, 769; 709/224, 225
  See application file for complete search history.

(56) References Cited

U.S. PATENT DOCUMENTS 6,047,070 A * 4/2000 Raaf ..................... H04M 1/675
                                                                379/91.01
6,138,073 A * 10/2000 Uchigaki ........... G01C 21/3611
                                                                701/410
(Continued)

FOREIGN PATENT DOCUMENTS

CN        101369381        2/2009
CN        102946455        2/2013
(Continued)

OTHER PUBLICATIONS

Alltechinside, Nova Launcher Prime Review, URL: https://www.youtube.com/watch?v=J1N7tv1np1k, accessed Sep. 8, 2017.

*Primary Examiner* — Daniel Kuddus
(74) *Attorney, Agent, or Firm* — Hodgson Russ LLP

(57) ABSTRACT

A method and an apparatus for providing a search result are provided. The method can include obtaining at least one search result card, in a computer memory, according to an input search term, in which each of the at least one search result card comprises a first surface and a second surface, and a search result is recorded on the first surface and/or the second surface. The first surface of each of the at least one search result card can be displayed on a display. A request to turn a first search result card over can be determined to have been received, in which the first search result card is the search result card firstly selected from the at least one research result card. The first search result card can be visually turned over to display the second surface of the first search result card on the display.

16 Claims, 8 Drawing Sheets

(51) Int. Cl.
*G06F 3/0483* (2013.01)
*G06F 3/0482* (2013.01)
*G06F 3/0484* (2013.01)

(52) U.S. Cl.
CPC ...... *G06F 3/04847* (2013.01); *G06F 17/3089* (2013.01); *G06F 17/30864* (2013.01); *G06F 17/30867* (2013.01); *G06F 17/30873* (2013.01); *G06F 17/30899* (2013.01); *G06F 17/30905* (2013.01); *G06F 2203/04802* (2013.01)

(56) References Cited

U.S. PATENT DOCUMENTS

| | | | | |
|---|---|---|---|---|
| 6,363,488 | B1 * | 3/2002 | Ginter | G06F 21/10 348/E5.006 |
| 6,389,402 | B1 * | 5/2002 | Ginter | G06F 21/10 348/E5.006 |
| 6,987,762 | B2 * | 1/2006 | Shiota | H04L 45/00 370/389 |
| 7,827,608 | B2 * | 11/2010 | Bird | G06F 17/30306 380/200 |
| 8,281,072 | B2 * | 10/2012 | Li | G06F 12/0888 711/103 |
| 8,730,495 | B2 * | 5/2014 | Mihira | H04N 1/00347 358/1.14 |
| 8,856,101 | B2 * | 10/2014 | Pigeon | G06F 17/30864 707/706 |
| 2001/0021189 | A1 * | 9/2001 | Shiota | H04L 45/00 370/389 |
| 2003/0182056 | A1 * | 9/2003 | Nozaki | G01C 21/26 701/426 |
| 2008/0040322 | A1 * | 2/2008 | Rucker | G06F 17/30896 |
| 2009/0019078 | A1 * | 1/2009 | Chisholm | G06F 3/0483 |
| 2009/0241061 | A1 * | 9/2009 | Asai | G01C 21/3611 715/808 |
| 2010/0070508 | A1 * | 3/2010 | Watanabe | G06F 21/6254 707/747 |
| 2010/0241648 | A1 * | 9/2010 | Ito | G06F 17/30011 707/765 |
| 2014/0289837 | A1 * | 9/2014 | Tomita | H04L 63/0838 726/8 |
| 2016/0055263 | A1 * | 2/2016 | Haine | G06F 9/4446 707/769 |

FOREIGN PATENT DOCUMENTS

| | | |
|---|---|---|
| CN | 103513866 | 1/2014 |
| EP | 2568371 | 3/2013 |
| EP | 2919134 | 9/2015 |

* cited by examiner

METHOD AND APPARATUS FOR PROVIDING SEARCH RESULT

CROSS REFERENCE TO RELATED APPLICATION

This application claims priority and benefits of Chinese Patent Application No. 201410088283.X, filed with State Intellectual Property Office on Mar. 11, 2014, the entire content of which is incorporated herein by reference.

FIELD

Embodiments of the present disclosure generally relate to a network communication technology, and more particularly, to a method and an apparatus for providing a search result.

BACKGROUND

With the development of intelligent terminals, a user can perform a search on the intelligent terminals such as a mobile phone. In the related art, after a user inputs a search term into the mobile phone, a search result is displayed to the user in a form of search result card, and the user can view the search result by clicking the search result card. Limited by a capacity of the search result card, a page link may be added in the search result card, and by clicking the page link, the user can switch to another page in which more information is recorded. For example, a business can add a homepage link thereof into the search result card, and the user may switch to the homepage by clicking the homepage link in the search result card, such that more information about the business can be obtained.

However, with the method in the related art, the user has to click the page link to jump to another page to obtain more information.

SUMMARY

Embodiments of the present disclosure seek to solve at least one of the problems existing in the related art to at least some extent.

Accordingly, one object of the present disclosure is to provide a method for providing a search result which can make full use of search result cards, and obtain more information from the search result cards without the need of web redirection, thus improving resource utilization.

Another object of the present disclosure is to provide an apparatus for providing a search result.

Embodiments of a first aspect of the present disclosure provide a method for providing a search result. The method includes: obtaining at least one search result card according to an input search term, in which each of the at least one search result card comprises a first surface and a second surface opposite to the first surface, and a search result is recorded on the first surface and/or the second surface; displaying the first surface of each of the at least one search result card; determining that a request to turn a first search result card over is received, in which the first search result card is the search result card firstly selected from the at least one research result card; and turning the first search result card over to display the second surface of the first search result card.

With the method according to embodiments of the present disclosure, by recording information on both the first surface and the second surface of the search result card and turning the search result card over, more information can be obtained than displaying the search result only on a single surface of the search result card, thus improving resource utilization and user experience.

Embodiments of a second aspect of the present disclosure provide an apparatus for providing a search result. The apparatus includes: an obtaining module configured to obtain at least one search result card according to an input search term, in which each of the at least one search result card comprises a first surface and a second surface opposite to the first surface, and a search result is recorded on the first surface and/or the second surface; a display module configured to display the first surface of each of the at least one search result card; a determining module configured to determine that a request to turn a first search result card over is received, in which the first search result card is the search result card firstly selected from the at least one search result card; and a turning module configured to turn the first search result card over to display the second surface of the first search result card.

With the apparatus according to embodiments of the present disclosure, by recording information on both the first surface and the second surface of the search result card and turning the search result card over, more information can be obtained than displaying the search result only on a single surface of the search result card, thus improving resource utilization and user experience.

Embodiments of a third aspect of the present disclosure provide a mobile terminal. The mobile terminal includes: a housing, a processor, a memory, a circuit board and a power source circuit. The circuit board is disposed in a space enclosed by the housing, and the processor and the memory are disposed on the circuit board. The power source circuit is configured to supply power to respective circuits or components of the mobile terminal. The memory is configured to store executable program codes. The processor is configured to run programs corresponding to the executable program codes by reading the executable program codes stored in the memory so as to perform following steps: obtaining at least one search result card according to an input search term, in which each of the at least one search result card comprises a first surface and a second surface opposite to the first surface, and a search result is recorded on the first surface and/or the second surface; displaying the first surface of each of the at least one search result card; determining that a request to turn a first search result card over is received, in which the first search result card is the search result card firstly selected from the at least one research result card; and turning the first search result card over to display the second surface of the first search result card.

With the mobile terminal according to embodiments of the present disclosure, by recording information on both the first surface and the second surface of the search result card and turning the search result card over, more information can be obtained than displaying the search result only on a single surface of the search result card, thus improving resource utilization and user experience.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
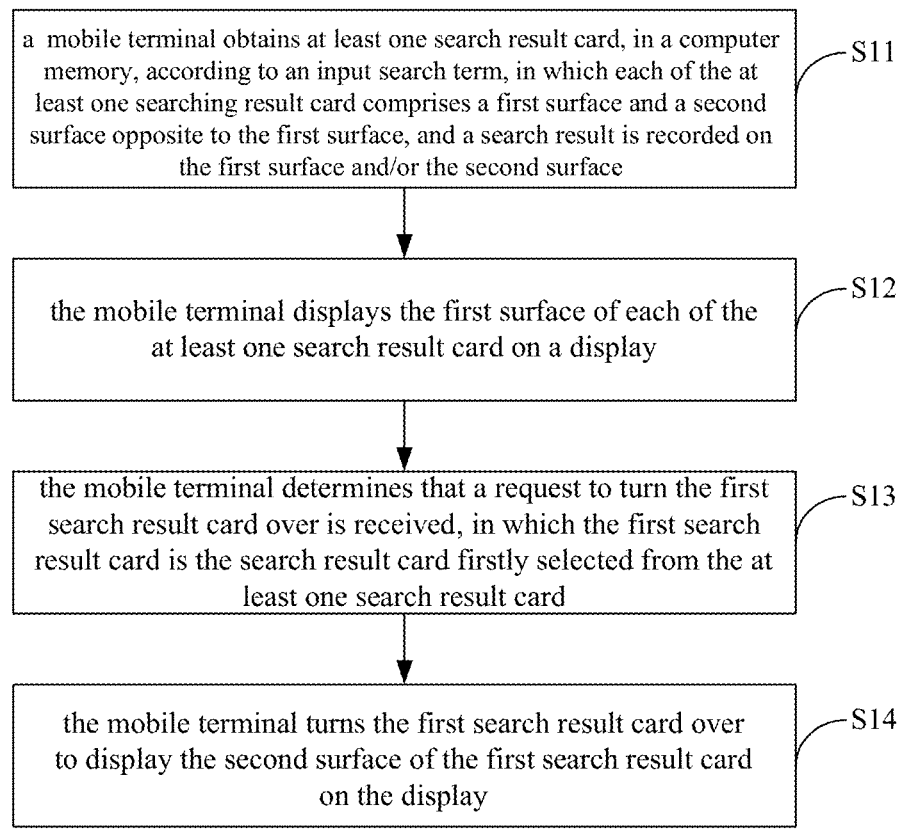
FIG. 1 is a flow chart of a method for providing a search result according to an embodiment of the present disclosure.

Reference will be made in detail to embodiments of the present disclosure. Examples of the embodiments are shown in the drawings, and the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. In contrast, the present disclosure may include alternatives, modifications and equivalents within the spirit and scope of the appended claims.

FIG. 1 is a flow chart of a method for providing a search result according to an embodiment of the present disclosure. The method includes following steps.

At step S11, a mobile terminal obtains at least one search result card, in a computer memory, according to an input search term. The search term may be input by a user. Each of the at least one search result card includes a first surface and a second surface opposite to the first surface, and a search result is recorded on the first surface and/or the second surface.

The mobile terminal may be a mobile phone or a tablet PC.

The mobile terminal may obtain the search result from a server and display the search result to the user via the search result card on a display, such as a computer display, including a mobile phone display.

For example, when "flower" is searched, the mobile terminal displays the search result card having "flower" to the user.

In the related art, each search result is displayed on a single surface of a search result card in the mobile terminal. When the user wishes to view more information, he can click the search result card to enter into the selected search result card.

In embodiments of the present disclosure, each search result card has two surfaces (the first surface and the second surface) which can be used to record the information and display the information respectively at different times.

Specifically, two modules corresponding to the first surface and the second surface respectively may be provided by means of a Cascading Style Sheet (CSS3) technology, the two modules may be opposite to each other, and each of the two modules has a turning property. A turning angle may be set according to an actual turning direction. Taking a left-right turning as an example, if the search result card is turned over from the first surface to the second surface anticlockwise, and is turned back from the second surface to the first surface clockwise, the turning angle may be set as 180°; if the search result card is turned over from the first surface to the second surface anticlockwise and is turned back from second surface to the first surface anticlockwise, the turning angle may be set as 360°.

In other words, the search result card may be obtained by following steps. Firstly, a search result card is set, in which the search result card is set to include the first surface and the second surface opposite to the first surface. Then, turning information is set for the first surface and the second surface, such that each of the first surface and the second surface has the turning property, and the first surface and the second surface are turned over synchronously.

In an embodiment of the present disclosure, the turning information includes a first turning direction and a second turning direction, in which the first turning direction is a turning direction from the first surface to the second surface, the second turning direction is a turning direction from the second surface to the first surface. The second turning direction may be a same direction with the first turning direction or an opposite direction to the first turning direction.

In another embodiment of the present disclosure, the turning information includes a first turning speed and a second turning speed, in which the first turning speed is a turning speed from the first surface to the second surface and the second turning speed is a turning speed from the second surface to the first surface. The first turning speed may be identical with or different from the second turning speed.

At step S12, the mobile terminal displays the first surface of the at least one search result card.

After the search result card is obtained, one of the two surfaces thereof may be displayed to the user for viewing.

At step S13, the mobile terminal determines that a request to turn a first search result card over is received, in which the first search result card is the search result card firstly selected from the at least one research result card.

In the related art, when the user wishes to view more information about a certain search result card, he can click the link in the search result card to jump to another page.

In embodiments of the present disclosure, when the user wishes to obtain more information on a certain search result card (for example, the search result card may be referred to as the first search result card), the first search result card may be triggered to turn over, such that information on the other surface of the first search result card can be provided to the user.

Alternatively, a predetermined hot region may be provided on each of the first surface and the second surface of the search result card. When the hot region is clicked by the user, it is indicated that the corresponding search result card is required to be turned over.

At step S14, the mobile terminal turns the first search result card over to display the second surface of the first search result card.

After it is determined that the request to turn the first search result card over is received (i.e. the user requires to turn the first search result card over), a turning operation may be performed on the first search result card.

During turning the first search result card over, a central axis of the first search result card in a left-right direction may be taken as a rotation axis, or a central axis of the first search result card in an up-down direction may be taken as a rotation axis.

Alternatively, link information may be recorded in a non-hot region of the first search result card. When the link information is clicked by the user, the mobile terminal jumps to a page indicated by the link information instead of turn the first search result card over, such that more information in the page indicated by the link information can be obtained.

Alternatively, the link information is recorded in the non-hot region on the first surface and/or the second surface of the first search result card.

In the embodiment of the present disclosure, by recording the information in both the first surface and the second surface of the search result card and turning the search result card over, the user can obtain more information than displaying the information only on a single surface of the search result card, thus improving resource utilization and user experience.

Figure 2:
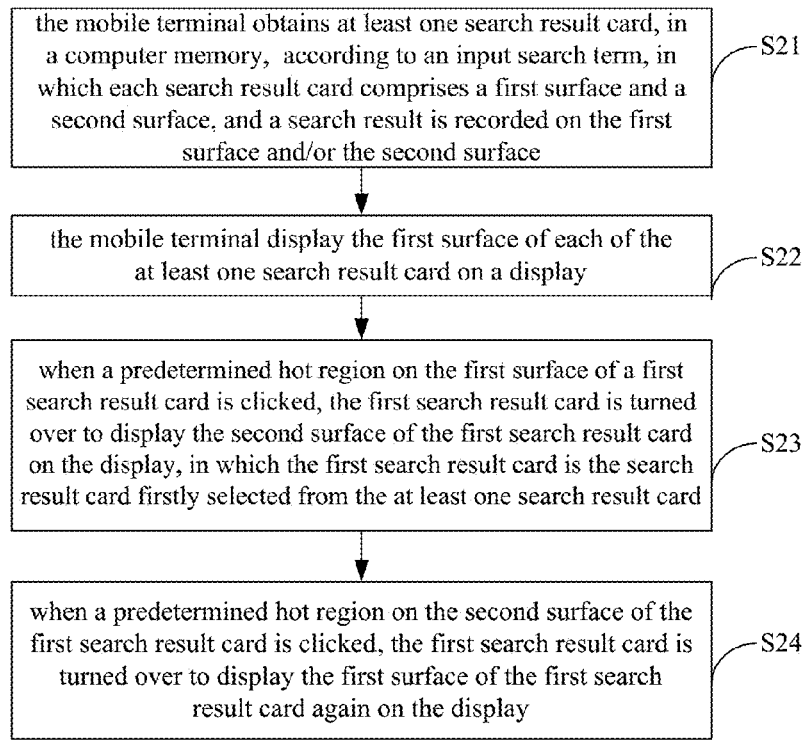
FIG. 2 is a flow chart of a method for providing a search result according to another embodiment of the present disclosure.

FIG. 2 is a flow chart of a method for providing a search result, in a computer memory, according to another embodiment of the present disclosure. The method includes following steps.

At step S21, the mobile terminal obtains at least one search result card according to an input search term. The search term may be input by a user. Each of the at least one search result card includes a first surface and a second surface opposite to the first surface, and a search result is recorded on the first surface and/or the second surface.

For example, when "flower" is searched, the mobile terminal displays the search result card having "flower" to the user.

In the relate art, each search result is displayed on a single surface of a search result card in the mobile terminal. When the user wishes to view more information, he can click the search result card to enter into the selected search result card.

In embodiments of the present disclosure, each search result card has two surfaces (the first surface and the second surface) which can be used to record the information and display the information respectively at different times.

At step S22, the mobile terminal displays the first surface of each of the at least one search result card on a display.

Figure 3:
FIG. 3 is a schematic diagram of displaying a first surface of a search result card on a display according to an embodiment of the present disclosure.

For example, as shown in FIG. 3, when the "flower" is searched, a plurality of search result cards may be obtained, and one of two surfaces of each search result card is displayed to the user on a display, such as a computer display, including mobile phone display 100.

At step S23, when a predetermined hot region on the first surface of the first search result is clicked, the first search result card is turned over to display the second surface of the first search result card on the display, in which the first search result card is the search result card firstly selected from the at least one search result card.

Figure 4:
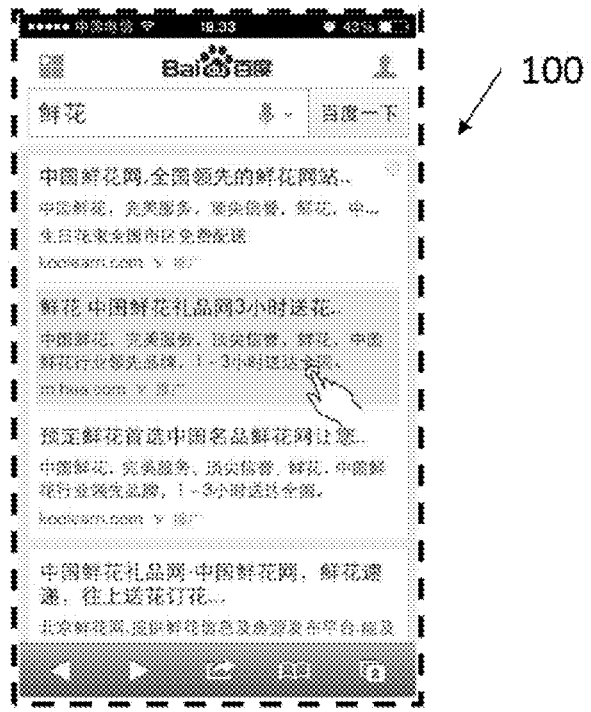
FIG. 4 is a schematic diagram of selecting a search result card to be turned over on a display according to an embodiment of the present disclosure.

As shown in FIG. 4, taking a case that the first search result card is the search result card displayed first on the page as an example, when the user clicks the hot region on the first search result card, the first search result card may be triggered to turn over on the mobile phone display 100.

Figure 5:
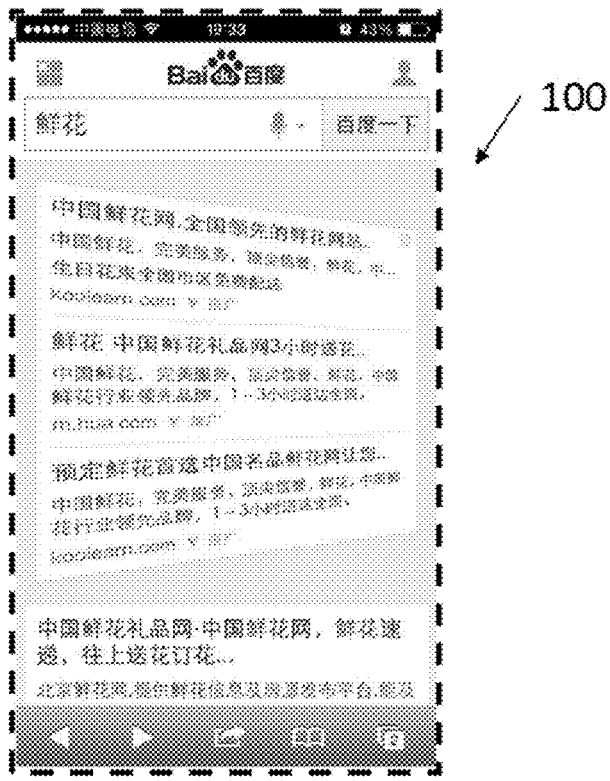
FIG. 5 is a schematic diagram showing an intermediate state during turning a search result card over on a display according to an embodiment of the present disclosure.
Figure 6:
FIG. 6 is a schematic diagram of displaying a second surface of a search result card on a display according to an embodiment of the present disclosure.

During turning the first search result card over, the first surface, an intermediate state and the second surface may be presented in turn, as shown in FIGS. 4-6 respectively. When the hot region is clicked, a series of coherent and dynamic actions such as turning to the intermediate start from a front side of the card and turning to a back side of the card from the intermediate state are presented three-dimensionally on the mobile phone display 100.

It should be noted that, an advertisement is taken as an example of the search result in the drawings. It can be understood that, for the advertisement, one search result card may include three items of content, and the three items of content are turned over together. For other search results, one search result card may include only one item of content, and thus the item of content is turned over solely.

At step S24, when a predetermined hot region on the second surface of the first search result card is clicked, the first search result card is turned over to display the first surface of the first search result card again on the display.

Figure 7:
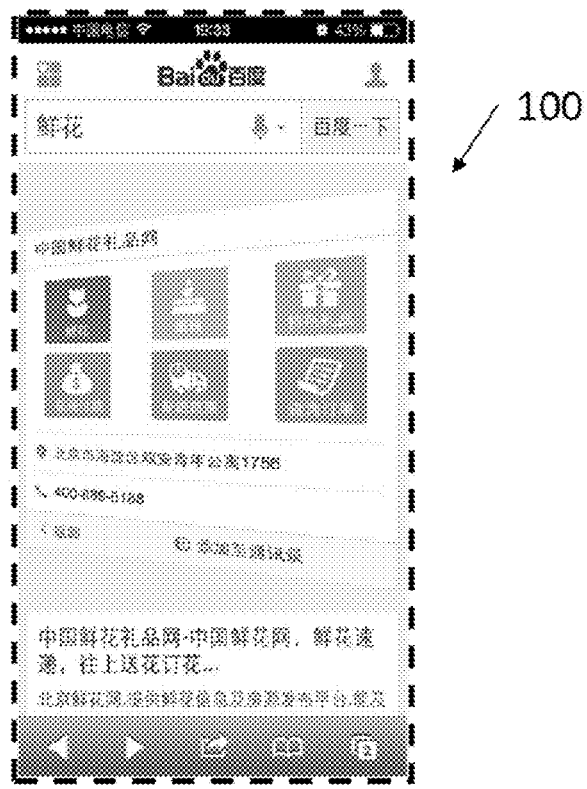
FIG. 7 is a schematic diagram of turning a search result card over from a second surface thereof on a display according to an embodiment of the present disclosure.
Figure 8:
FIG. 8 is a schematic diagram of displaying a first surface of a search result card after turning the search result card over from a second surface thereof on a display according to an embodiment of the present disclosure.

For example, as shown in FIGS. 7 and 8, the first search result card is turned over from the second surface to the first surface, and the first surface of the first search result card is displayed to the user again on a computer display, such as the mobile phone display 100.

In the embodiment of the present disclosure, by turning the search result card over, it is possible to make full use of both the first surface and the second surface of the search result card. For example, for the search result card having the advertisement, an advertisement headline may be recorded in one surface of the search result card and a landing page of an advertiser may be recorded in the other surface of the search result card. Alternatively, an additional idea (such as a map) of the advertisement may be recorded in one surface of the search result card and a real time Baidu map product may be recorded in the other surface of the search result card.

In the embodiment of the present disclosure, by turning the search result card over and recording information on both the first surface and the second surface of the search result card, more information can be obtained without the need of web redirection, thus improving resource utilization and closing a distance between the user, a search service provider (such as Baidu) and a search content provider (such as the advertiser). By making use of the back side of the search result card, the user can have a series of experiences complemented throughout the search result card without jumping to various landing pages or jumping to other pages, thus reducing a user churn rate and improving user experience.

Figure 9:
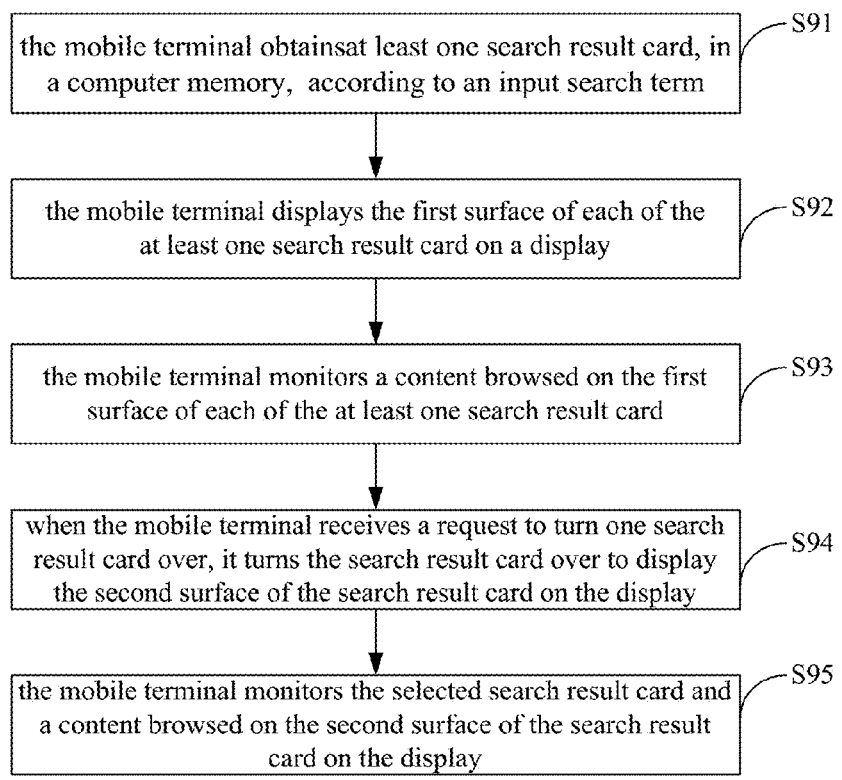
FIG. 9 is a flow chart of a method for providing a search result according to yet another embodiment of the present disclosure.

FIG. 9 is a flow chart of a method for providing a search result according to yet another embodiment of the present disclosure. The method includes following steps.

At step S91, the mobile terminal obtains at least one search result card, in a computer memory, according to an input search term.

At step S92, the mobile terminal displays a first surface of each of the at least one search result card on a display.

Detailed description of implementing steps S91 and S92 may refer to that described in steps S11 and S12, and will be omitted herein.

At step S93, the mobile terminal monitors a content browsed on the first surface of the at least one search result card.

The mobile terminal may monitor a behavior of the user in the background and take the behavior of the user as a data basis of a subsequent process. For example, the mobile terminal monitors which advertisements are browsed by the user and then provides analysis data to the advertiser, such that the advertiser can optimize the adverting according to the analysis data.

At step S94, when the mobile terminal determines that a request to turn one search result card over is received, the mobile terminal turns the search result card over to display the second surface of the search result card on the display.

An implementation of turning the search result card over may be seen from the above embodiments of the present disclosure, and will be omitted herein.

At step S95, the mobile terminal monitors the selected search result card and a content browsed on the second surface of the search result card on the display.

Similarly, by monitoring the behavior of the user, a strong support may be provided for the subsequent process.

In the embodiment of the present disclosure, by recording the information on the first surface and the second surface of the search result card, the browsing behavior of the user can be returned into the search result card, such that it is more convenient to monitor the behavior of the user and to provide the strong support for the subsequent process.

Figure 10:
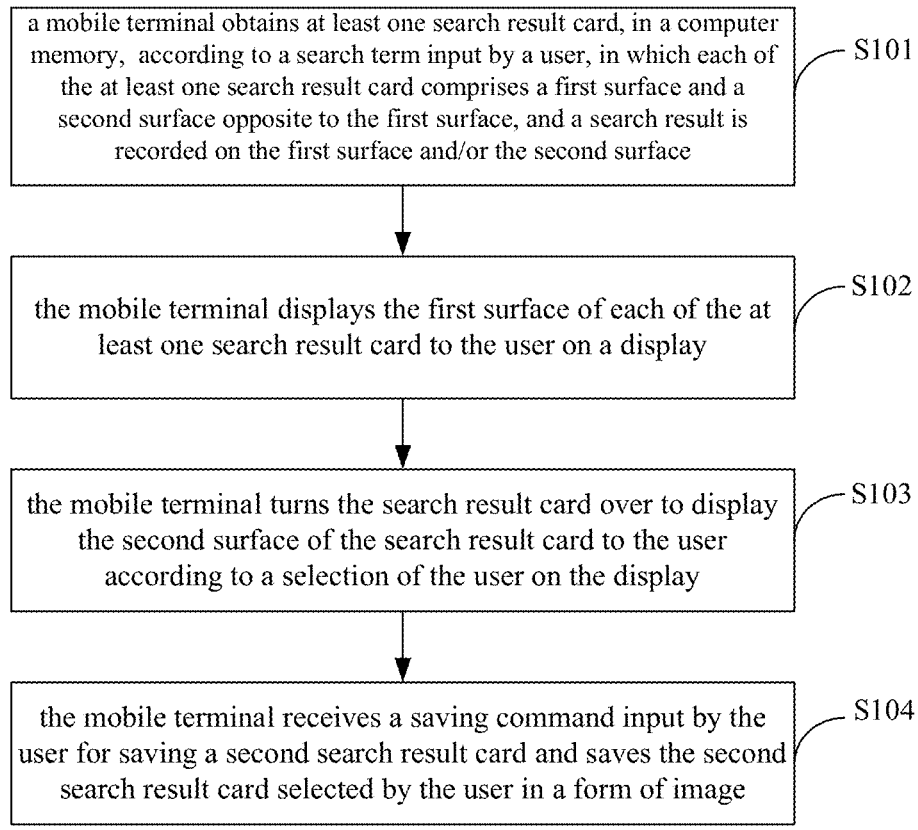
FIG. 10 is a flow chart of a method for providing a search result according to still yet another embodiment of the present disclosure.

FIG. 10 is a flow chart of a method for providing a search result according to still yet another embodiment of the present disclosure. The method includes following steps.

As step S101, a mobile terminal obtains at least one search result card, in a computer memory, according to a search term input by a user. Each of the at least one search result card includes a first surface and a second surface opposite to the first surface, and a search result is recorded on the first surface and/or the second surface.

At step S102, the mobile terminal displays the first surface of each of the at least one search result card to the user on a display.

Detailed description of implementing steps S101 and S102 may refer to that described in steps S11 and S12, and will be omitted herein.

At step S103, the mobile terminal turns one search result card over to display the second surface of the search result card to the user according to a selection of the user on the display.

At step S104, the mobile terminal receives a saving command input by the user for saving a second search result card and saves the search result card selected by the user in a form of image.

For example, if the user wishes to save the search result card after browsing the first surface and the second surface of the search result card, a predetermined saving button may be clicked, i.e., the saving command is sent to the mobile terminal, and then the mobile terminal receives the saving command and saves the search result card.

Based on the above embodiments of the present disclosure, with the method in this embodiment, a saving operation may also be implemented, such that it is convenient for the user to find the corresponding information in later use. In addition, by recording information on both surfaces of the search result card, the advertiser may be regarded as a "person", and the search result card may be regarded as a business card of the advertiser, in which brief information of the advertiser is recorded in the front side of the card, and detailed information such as an "address" and a "contact number" of the advertiser is recorded in the back side of the card, such that this "business card" may be saved in the mobile phone of the user, thus making it convenient for use and improving user experience.

Figure 11:
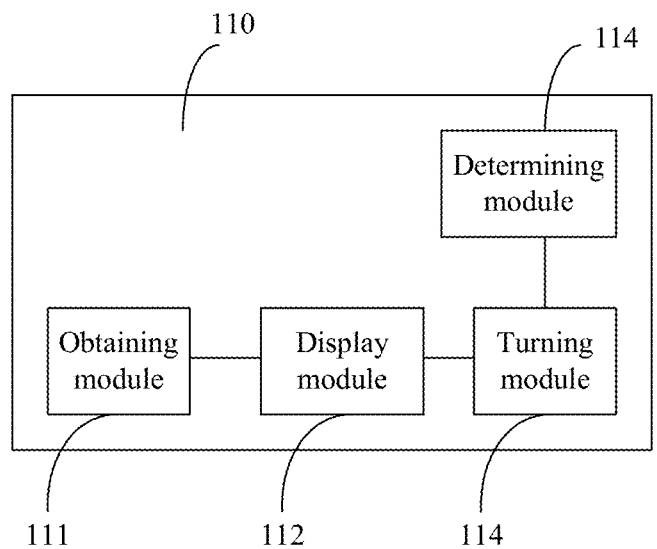
FIG. 11 is a block diagram of an apparatus for providing a search result according to an embodiment of the present disclosure.

FIG. 11 is a block diagram of an apparatus for providing a search result according to an embodiment of the present disclosure. As shown in FIG. 11, the apparatus 110 includes an obtaining module 111, a display module 112, a determining module 113 and a turning module 114.

The obtaining module 111 is configured to obtain at least one search result card according to an input search term. The search term may be input by the user. Each of the at least one search result card comprises a first surface and a second surface opposite to the first surface, and a search result is recorded on the first surface and/or the second surface.

The apparatus may be a mobile terminal such as a mobile phone or a tablet PC.

The apparatus may obtain the search result from a server and display it to the user via the search result card.

For example, when "flower" is searched, the mobile terminal displays the search result card having "flower" to the user.

In the relate art, each search result is displayed on a single surface of a search result card in the mobile terminal. When the user wishes to view more information, he can click the search result card to enter into the selected search result card.

In the embodiment of the present disclosure, each search result card has two surfaces (the first surface and the second surface) which can be configured to record the information and display the information respectively at different times.

Specifically, two modules corresponding to the first surface and the second surface respectively may be provided by means of a Cascading Style Sheet (CSS3) technology, the two modules may be opposite to each other, and each of the two modules has a turning property. A turning angle may be set according to an actual turning direction. Taking a left-right turning as an example, if the search result card is turned over from the first surface to the second surface anticlockwise, and is turned back from the second surface to the first surface clockwise, the turning angle may be set as 180°; if the search result card is turned over from the first surface to the second surface anticlockwise and is turned back from second surface to the first surface anticlockwise, the turning angle may be set as 360°.

In other words, the search result card may be obtained by following steps. Firstly, a search result card is set, in which the search result card is set to include the first surface and the second surface opposite to the first surface. Then, turning information is set for the first surface and the second surface, such that each of the first surface and the second surface has the turning property, and the first surface and the second surface are turned over synchronously.

In an embodiment of the present disclosure, the turning information includes a first turning direction and a second turning direction, in which the first turning direction is a turning direction from the first surface to the second surface, the second turning direction is a turning direction from the second surface to the first surface. The second turning direction may be a same direction with the first turning direction or an opposite direction to the first turning direction.

In another embodiment of the present disclosure, the turning information includes a first turning speed and a second turning speed, in which the first turning speed is a turning speed from the first surface to the second surface and the second turning speed is a turning speed from the second surface to the first surface. The first turning speed may be identical with or different from the second turning speed.

The display module 112 is configured to display the first surface of the at least one search result card.

After the search result card is obtained, one of the two surfaces thereof may be presented to the user for viewing.

For example, as shown in FIG. 3, when "flower" is searched, a plurality of search result cards are obtained, and one of two surfaces of each of the plurality of search result cards is displayed to the user on the mobile phone display 100.

The determining module 113 is configured to determine that a request to turn a first search result card over is received. The first search result card is the search result card firstly selected from the at least one research result card.

In the related art, when the user wants to view more information, the link in the search result card can be clicked so as to jump to another page.

In the embodiment, when the user wishes to view more information on a certain search result card (for example, the search result card may be referred to as the first search result card), the first search result card may be triggered to turn over, such that information on the other surface (i.e., the second surface) of the first search result card can be provided to the user.

As shown in FIG. 4, taking a case that the first search result card is the search result card displayed first on the page as an example, when the user clicks a hot region on the first search result card, the first search result card may be triggered to turn over on the mobile phone display 100.

During turning the first search result card over, the first surface, an intermediate state and the second surface may be presented in turn, as shown in FIGS. 4-6 respectively. When the hot region is clicked, a series of coherent and dynamic actions such as turning to the intermediate state from a front side of the card and turning to a back side of the card from the intermediate state are presented three-dimensionally on the mobile phone display 100.

It should be noted that, an advertisement is taken as an example of the search result in the drawings. It can be understood that, for the advertisement, one search result card may include three items of content, and the three items of content are turned over together. For other search results, one search result card may include only one item of content, and thus the item of content is turned over solely.

The turning module 114 is configured to turn the first search result card over to display the second surface of the first search result card.

After it is determined that the request to turn the first search result card over is received (i.e. the user requires to turn the first search result card over), a turning operation may be performed on the first search result card.

In an embodiment of the present disclosure, the determining module 113 is further configured to determine that a request to turn the first search result card over again is received (i.e. the user requires to turn the first search result card over again).

The turning module 114 is further configured to turn the first search result over again so as to display the first surface of the first search result card again.

For example, as shown in FIGS. 7 and 8, the first search result card is turned over from the second surface to the first surface, and thus the first surface is displayed again on the mobile phone display 100.

In an embodiment of the present disclosure, the determining module 113 determines that the request to turn the first search result card over is received, when a predetermined hot region on the search result card is clicked.

In an embodiment of the present disclosure, the predetermined hot region on the first surface of the first search result card is identical with or different from that on the second surface of the first search result card.

In an embodiment of the present disclosure, the turning module is configured to turn the first search result card over by taking a central axis of the first search result card in a left-right direction as a rotation axis, or to turn the first search result card over by taking a central axis of the first search result card in an up-down direction as a rotation axis.

In the embodiment of the present disclosure, by turning the search result card over, it is possible to make full use of both the first surface and the second surface of the search result card. For example, for the search result card having the advertisement, an advertisement headline may be recorded in one surface of the search result card and a landing page of an advertiser may be recorded in the other surface of the search result card. Alternatively, an additional idea (such as a map) of the advertisement may be recorded in one surface of the search result card and a real time Baidu map product may be recorded in the other surface of the search result card.

In the embodiment of the present disclosure, by turning the search result card over and recording information on both the first surface and the second surface of the search result card, more information can be obtained without jumping to another page, thus improving resource utilization and closing a distance between the user, a search service provider (such as Baidu) and a search content provider (such as the advertiser). By making use of the back side of the search result card, the user can have a series of experiences complemented throughout the search result card without jumping to various landing pages or jumping to other pages, thus reducing a user churn rate and improving user experience.

Figure 12:
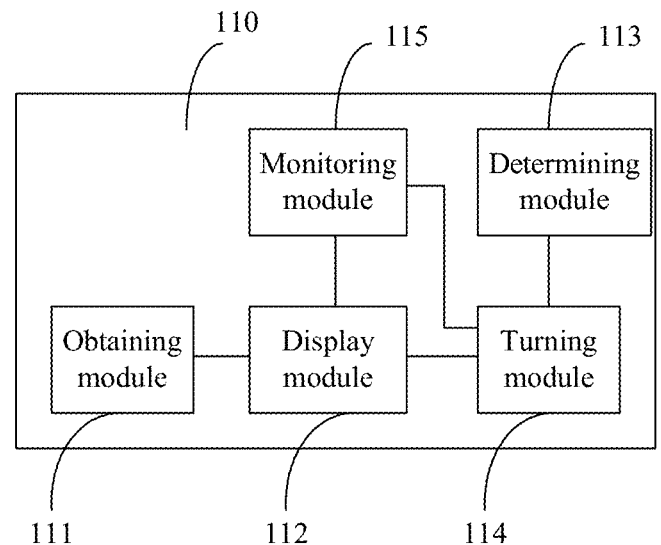
FIG. 12 is a block diagram of an apparatus for providing a search result according to another embodiment of the present disclosure.

FIG. 12 is a block diagram of an apparatus for providing a search result card according to another embodiment of the present disclosure. As shown in FIG. 12, based on the embodiment of the present disclosure shown in FIG. 11, the apparatus further includes a monitoring module 115.

The monitoring module 115 is configured to monitor a content browsed on the first surface and the second surface of the at least one search result card.

The mobile terminal may monitor a behavior of the user in the background and take the behavior of the user as a data basis of a subsequent process. For example, the mobile terminal monitors which advertisements are browsed by the user and then provides analysis data to the advertiser, such that the advertiser can optimize the adverting according to the analysis data.

In the embodiment of the present disclosure, by recording the information on the first surface and the second surface of the search result card, the browsing behavior of the user can be returned into the search result card, such that it is more convenient to monitor the behavior of the user and to provide a strong support for the subsequent process.

Figure 13:
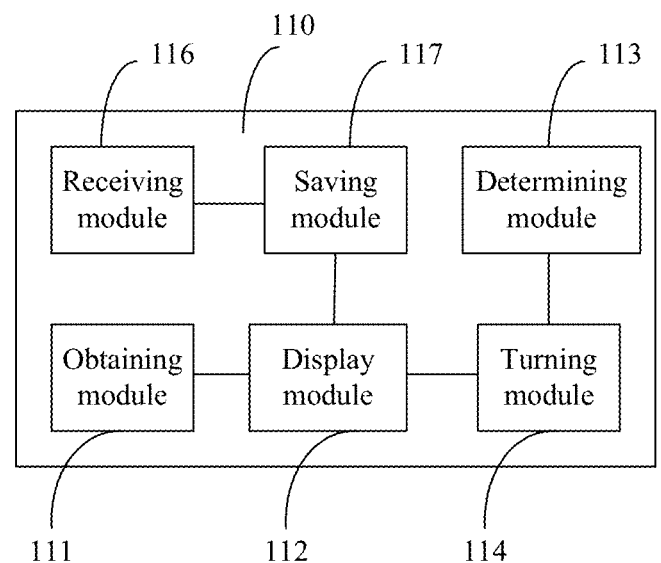
FIG. 13 is a block diagram of an apparatus for providing a search result according to yet another embodiment of the present disclosure.

FIG. 13 is a block diagram of an apparatus for providing a search result according to yet another embodiment of the present disclosure. As shown in FIG. 13, based on the embodiment of the present disclosure shown in FIG. 11, the apparatus further includes a receiving module 116 and a saving module 117.

The receiving module 116 is configured to receive an saving command for saving a second search result card. The second search result card is a search result card selected from the at least one search result card and is identical with or different from the first search result card. The saving module 117 is configured to save the second search result card in a form of image.

For example, if the user wishes to save the search result card after browsing the first surface and the second surface of the search result card, a predetermined saving button may be clicked, i.e., the saving command is sent to the mobile terminal, and then the mobile terminal receives the saving command and saves the search result card.

Based on the above embodiments, with the apparatus shown in FIG. 13, a saving operation may also be implemented, such that it is convenient for the user to find the corresponding information in later use. In addition, by recording information on both surfaces of the search result card, the advertiser may be regarded as a "person", and the search result card may be regarded as a business card of the advertiser, in which brief information is recorded in the front side of the card, and detailed information such as an "address" and a "contact number" of the advertiser is recorded in the back side of the card, such that the "business card" may be saved in the mobile phone of the user, thus making it convenient for use and improving user experience.

Figure 14:
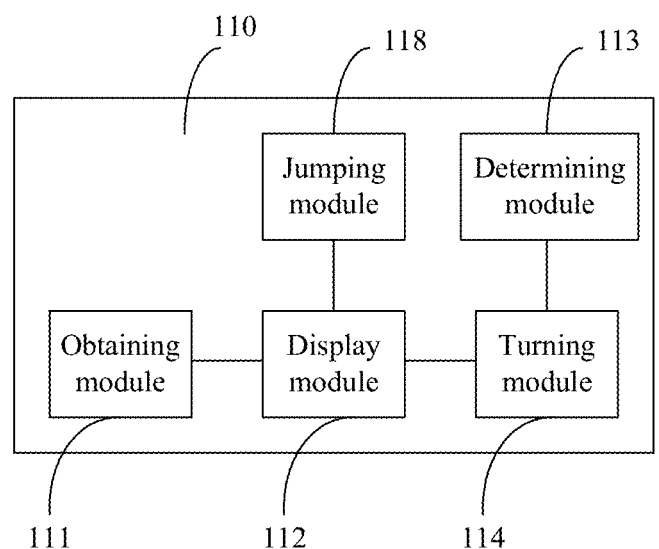
FIG. 14 is a block diagram of an apparatus for providing a search result according to still yet another embodiment of the present disclosure.

FIG. 14 is a block diagram of an apparatus for providing a search result card according to sill yet another embodiment of the present disclosure. As shown in FIG. 14, based on the embodiment of the present disclosure shown in FIG. 11, the apparatus further includes a jumping module 118. In the embodiment of the present disclosure, link information is recorded in a non-hot region of the first search result card, and the jumping module 118 is configured to jump to a page indicated by the link information when the link information is clicked.

The link information may be recorded in the non-hot region on the first surface and/or the second surface of the first search result card.

With this embodiment based the above embodiments of the present disclosure, a jumping operation can be implemented and more information can be obtained.

Embodiments of the present further provide a mobile terminal. The mobile terminal includes: a housing, a processor, a memory, a circuit board and a power source circuit. The circuit board is disposed in a space enclosed by the housing, and the processor and the memory are disposed on the circuit board. The power source circuit is configured to supply power to respective circuits or components of the mobile terminal. The memory is configured to store executable program codes. The processor is configured to run programs corresponding to the executable program codes by reading the executable program codes stored in the memory so as to perform following steps.

At step S11', a mobile terminal obtains at least one search result card according to an input search term. The search term may be input by a user. Each of the at least one search result card includes a first surface and a second surface opposite to the first surface, and a search result is recorded on the first surface and/or the second surface.

The mobile terminal may be a mobile phone or a tablet PC.

The mobile terminal may obtain the search result from a server and display the search result to the user via the search result card.

For example, when "flower" is searched, the mobile terminal displays the search result card having "flower" to the user.

In the related art, each search result is displayed on a single surface of a search result card in the mobile terminal. When the user wishes to view more information, he can click the search result card, via an input device, to enter into the selected search result card. The input device can be a device that cooperates with a computer, for example a mobile phone. The input device may register a click, trap, gesture, or the like.

In the embodiment of the present disclosure, each search result card has two surfaces (the first surface and the second surface) which can be configured to record the information and display the information respectively at different times.

Specifically, two modules corresponding to the first surface and the second surface respectively may be provided by means of a Cascading Style Sheet (CSS3) technology, the two modules may be opposite to each other, and each of the two modules has a turning property. A turning angle may be set according to an actual turning direction. Taking a left-right turning as an example, if the search result card is turned over from the first surface to the second surface anticlockwise, and is turned back from the second surface to the first surface clockwise, the turning angle may be set as 180°; if the search result card is turned over from the first surface to the second surface anticlockwise and is turned back from second surface to the first surface anticlockwise, the turning angle may be set as 360°.

In other words, the search result card may be obtained by following steps. Firstly, a search result card is set, in which the search result card is set to include the first surface and the second surface opposite to the first surface. Then, turning information is set for the first surface and the second surface, such that each of the first surface and the second surface has the turning property, and the first surface and the second surface are turned over synchronously.

In an embodiment of the present disclosure, the turning information includes a first turning direction and a second turning direction, in which the first turning direction is a turning direction from the first surface to the second surface, the second turning direction is a turning direction from the second surface to the first surface. The second turning direction may be a same direction with the first turning direction or an opposite direction to the first turning direction.

In another embodiment of the present disclosure, the turning information includes a first turning speed and a second turning speed, in which the first turning speed is a turning speed from the first surface to the second surface and the second turning speed is a turning speed from the second surface to the first surface. The first turning speed may be identical with or different from the second turning speed.

At step S12', the mobile terminal displays the first surface of the at least one search result card.

After the search result card is obtained, one of the two surfaces thereof may be presented to the user for viewing.

At step S13', the mobile terminal determines that a request to turn a first search result card over is received, in which the first search result card is the search result card firstly selected from the at least one research result card.

In the related art, when the user wants to view more information about a certain search result card, the link in the search result card can be clicked to jump to another page.

In the embodiment, when the user wishes to obtain more information on a certain search result card (for example, the search result card may be referred to as the first search result card), the first search result card may be triggered to turn over, such that information on the other surface (i.e., the second surface) of the first search result card can be provided to the user.

Alternatively, a predetermined hot region may be provided on each of the first surface and the second surface of the search result card. When the hot region is clicked by the user, it is indicated that the corresponding search result card is required to be turned over.

At step S14', the mobile terminal turns the first search result card over to display the second surface of the first search result card.

After it is determined that the mobile terminal receives the request to turn the first search result card over (i.e. the user requires to turn the first search result card over), a turning operation may be performed on the first search result card.

During turning the first search result card over, a central axis of the first search result card in a left-right direction may be taken as a rotation axis, or a central axis of the first search result card in an up-down direction may be taken as a rotation axis.

Alternatively, link information may be recorded in a non-hot region of the first search result card. When the link information is clicked by the user, the mobile terminal jumps to a page indicated by the link information instead of turn the first search result card over, such that more information in the page indicated by the link information can be obtained.

Alternatively, the link information is recorded in the non-hot region on the first surface and/or the second surface of the first search result card.

In the embodiment of the present disclosure, by recording the information in both the first surface and the second surface of the search result card and turning the search result card over, the user can obtain more information than displaying the information only on a single surface of the search result card, thus improving resource utilization and user experience.

In another embodiment of the present disclosure, the processor run programs corresponding to the executable program codes by reading the executable program codes stored in the memory so as to perform following steps.

At step S21', the mobile terminal obtains at least one search result card according to an input search term. The search term may be input by a user. Each of the at least one search result card includes a first surface and a second surface opposite to the first surface, and a search result is recorded on the first surface and/or the second surface.

For example, when "flower" is searched, the mobile terminal displays the search result card having "flower" to the user.

In the relate art, each search result is displayed on a single surface of a search result card in the mobile terminal. When the user wishes to view more information, he can click the search result card to enter into the selected search result card.

In the embodiment of the present disclosure, each search result card has two surfaces (the first surface and the second surface) which can be configured to record the information and display the information respectively at different times.

At step S22', the mobile terminal displays the first surface of each of the at least one search result card.

For example, as shown in FIG. 3, when the "flower" is searched, a plurality of search result cards may be obtained, and one of two surfaces of each search result card is displayed to the user on the mobile phone display 100.

At step S23', when a predetermined hot region on the first surface of the first search result is clicked, the first search result card is turned over to display the second surface of the first search result card, in which the first search result card is the search result card selected firstly from the at least one search result card.

As shown in FIG. 4, taking a case that the first search result card is the search result card displayed first on the page as an example, when the user clicks the hot region on the first search result card, the first search result card may be triggered to turn over on a computer display, such as the mobile phone display 100.

During turning the first search result card over, the first surface, an intermediate state and the second surface may be presented in turn as shown in FIGS. 4-6 respectively. When the hot region is clicked, a series of coherent and dynamic actions such as turning to the intermediate start from a front side of the card and further turning to a back side of the card from the intermediate state are presented three-dimensionally on a computer display, such as the mobile phone display 100.

It should be noted that, an advertisement is taken as an example of the search result in the drawings. It can be understood that, for the advertisement, one search result card may include three items of content, and the three items of content are turned over together. For other search results, the search result card may include only one item of content, and the item of content is turned over solely.

At step S24', when a predetermined hot region on the second surface of the first search result card is clicked, the first search result card is turned over to display the first surface of the first search result card again.

For example, as shown in FIGS. 7 and 8, the first search result card is turned over from the second surface to the first surface, and the first surface of the search result card is displayed to the user again on the mobile phone display 100.

In the embodiment of the present disclosure, by turning the search result card over, it is possible to make full use of both the first surface and the second surface of the search result card. For example, for the search result card having the advertisement, an advertisement headline may be recorded in one surface of the search result card and a landing page of an advertiser may be recorded in the other surface of the search result card. Alternatively, an additional idea (such as a map) of the advertisement may be recorded in one surface of the search result card and a real time Baidu map product may be recorded in the other surface of the search result card.

In the embodiment of the present disclosure, by turning the search result card over and recording information on both the first surface and the second surface of the search result card, more information can be obtained without jumping to another page, thus improving resource utilization and closing a distance between the user, a search service provider (such as Baidu) and a search content provider (such as the advertiser). By making use of the back side of the search result card, the user can have a series of experiences complemented throughout the search result card without jumping to various landing pages or jumping to other pages, thus reducing a user churn rate and improving user experience.

In another embodiment of the present disclosure, the processor run programs corresponding to the executable program codes by reading the executable program codes stored in the memory so as to perform following steps.

At step S91', the mobile terminal obtains at least one search result card according to an input search term.

At step S92', the mobile terminal displays a first surface of each of the at least one search result card.

Detailed description of implementing steps S91 and S92 may refer to that described in steps S11 and S12, and will be omitted herein.

At step S93', the mobile terminal monitors a content browsed on the first surface of the at least one search result card.

The mobile terminal may monitor a behavior of the user in the background and take the behavior of the user as a data basis of a subsequent process. For example, the mobile terminal monitors the advertisements browsed by the user and provides analysis data to the advertiser, such that the advertiser can optimize the adverting according to the analysis data.

At step S94', when the mobile terminal receives a request to turn one search result card over, the mobile terminal turns the search result card over to display the second surface of the search result card.

An implementation of turning the search result card over may be seen from the above embodiments of the present disclosure, and will be omitted herein.

At step S95', the mobile terminal monitors the selected search result card and a content browsed on the second surface of the search result card.

Similarly, by monitoring the behavior of the user, a strong support may be provided for the subsequent process.

In the embodiment of the present disclosure, by recording the information on the first surface and the second surface of the search result card, the browsing behavior of the user can be returned into the search result card, such that it is more convenient to monitor the behavior of the user and to provide the strong support for the subsequent process.

In another embodiment of the present disclosure, the processor runs programs corresponding to the executable program codes by reading the executable program codes stored in the memory so as to perform following steps.

As step S101', a mobile terminal obtains at least one search result card according to a search term input by a user, in which each of the at least one search result card includes a first surface and a second surface opposite to the first surface, and a search result is recorded on the first surface and/or the second surface.

At step S102', the mobile terminal displays the first surface of each of the at least one search result card to the user.

Detailed description of implementing steps S101 and S102 may refer to that described in steps S11 and S12, and will be omitted herein.

At step S103', the mobile terminal turns one search result card over to display the second surface of the search result card to the user according to a selection of the user.

At step S104', the mobile terminal receives a saving command input by the user for saving a second search result card and saves the second search result card selected by the user in a form of image.

For example, if the user wishes to save the search result card after browsing the first surface and the second surface of the search result card, a predetermined saving button may be clicked, i.e., the saving command is sent to the mobile terminal, and then the mobile terminal receives the saving command and saves the search result card.

With this embodiment based on the above embodiments of the present disclosure, a saving operation may also be implemented, such that it is convenient for the user to find the corresponding information in later use. In addition, by recording the information on both surfaces of the search result card, the advertiser may be regarded as a "person", and the search result card may be regarded as a business card of the advertiser, in which brief information is recorded in the front side of the card, and detailed information such as an "address" and a "contact number" of the advertiser is recorded in the back side of the card, such that the "business card" may be saved in the mobile phone of the user, thus making it convenient for use and improving user experience.

It should be noted that, in descriptions of the present disclosure, terms such as "first" and "second" are used herein for purposes of description and are not intended to indicate or imply relative importance or significance. In addition, in the description of the present disclosure, "a plurality of" relates to two or more than two, unless specified or limited otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a tangible computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a tangible computer readable storage medium. The tangible storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

In the specification, unless specified or limited otherwise, relative terms such as "central", "longitudinal", "length", "width", "thickness", "lateral", "up", "down", "front", "rear", "left", "right", "horizontal", "vertical", "top", "bottom", "inner", "outer", "clockwise", "anticlockwise", "axial", "radial", "circumferential" as well as derivative thereof should be construed to refer to the orientation as then described or as shown in the drawings under discussion. These relative terms are for convenience of description and do not require that the present disclosure be constructed or operated in a particular orientation.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for providing a search result, comprising:
   receiving an input search term from a user, the input search term corresponding to an internet search request;
   obtaining at least two search result cards, in a computer memory, according to the input search term, wherein each of the at least two search result cards comprises a first surface and a second surface, and a search result based on the input search term is recorded on the first surface and/or the second surface;
   displaying the first surface of each of the at least two search result cards in a page on a display;
   determining that a request to turn a first search result card of the at least two search result cards over is received, wherein the first search result card is the search result card firstly selected from the at least two research result cards;
   turning the first search result card over in the page to display the second surface of the first search result card in the page on the display without turning a second search result card of the at least two search result cards on the display;
   monitoring content browsed by the user on the first surface and the second surface of the at least two search result cards; and
   reporting advertisement analysis information based on the monitored content;
   wherein determining that a request to turn a first search result card over is received comprises:
   determining that the request to turn the first search result card over is received when a predetermined hot region is clicked, in which the predetermined hot region on the first surface of the first search result card is identical with or different from that on the second surface of the first search result card.

2. The method according to claim 1, further comprising:
   determining that a request to turn the first search result card over again is received;
   turning the first search result card over again to display the first surface of the first search result card on the display.

3. The method according to claim 1, further comprising:
   receiving a saving command for saving a second search result card, wherein the second search result card is a search result card selected from the at least two research result cards and is identical with or different from the first search result card;
   saving the second search result card in a form of image.

4. The method according to claim 1, wherein turning the first search result card over on the display comprises:
   turning the first search result card over by taking a central axis of the first search result card in a left-right direction as a rotation axis; or
   turning the first search result card over by taking a central axis of the first search result card in an up-down direction as a rotation axis.

5. The method according to claim 1, wherein link information is recorded in a non-hot region on the first surface and/or the second surface of the first search result card and the method further comprises:
   jumping to a page indicated by the link information when the link information is clicked.

6. The method according to claim 1, wherein each of the at least two research result cards is obtained by:
   setting a search result card, in which the search result card is set to comprise the first surface and the second surface;
   setting turning information for the first surface and the second surface, such that each of the first surface and the second surface has a turning property, and the first surface and the second surface are turned over synchronously on the display.

7. The method according to claim 6, wherein the turning information comprises a first turning direction and a second turning direction, in which the first turning direction is a turning direction from the first surface to the second surface, the second turning direction is a turning direction from the second surface to the first surface, and the second turning direction is a same direction with the first turning direction or an opposite direction to the first turning direction.

8. The method according to claim 6, wherein the turning information comprises a first turning speed and a second turning speed, in which the first turning speed is a turning speed from the first surface to the second surface and the second turning speed is a turning speed from the second surface to the first surface, and the first turning speed is identical with or different from the second turning speed.

9. An apparatus for providing a search result, comprising:
one or more hardware processors configured to execute one or more software modules, the one or more software modules including:
an obtaining module configured to obtain at least two search result cards, in a computer memory, according to an input search term corresponding to an internet search request from a user, wherein each of the at least two search result cards comprises a first surface and a second surface, and a search result is recorded on the first surface and/or the second surface;
a display module configured to display the first surface of each of the at least two search result cards in a page on a display;
a determining module configured to determine that a request to turn a first search result card over is received, wherein the first search result card is the search result card firstly selected from the at least two search result cards;
a turning module configured to turn the first search result card over in the page to display the second surface of the first search result card in the page on the display without turning a second search result card of the at least two search result cards on the display;
a monitoring module configured to monitor a content browsed on the first surface and the second surface of the at least two search result cards; and
wherein at least one of the one or more software modules is configured to report advertisement analysis information based on the monitored content;
wherein the determining module is configured to determine that the request to turn the first search result card over is received when a predetermined hot region is clicked, in which the predetermined hot region on the first surface of the first search result card is identical with or different from that on the second surface of the first search result card.

10. The apparatus according to claim 9, wherein
the determining module is further configured to determine that a request to turn the first search result card over again is received; and
the turning module is further configured to turn the first search result card over again to display the first surface of the first search result card on the display.

11. The apparatus according to claim 9, further comprising:
a receiving module configured to receive a saving command for saving a second search result card, wherein the second search result card is a search result card selected from the at least two search result cards and is identical with or different from the first search result card;
a saving module configured to save the second search result card in a form of image.

12. The apparatus according to claim 9, wherein the turning module is configured to:
visually turn the first search result card over by taking a central axis of the first search result card in a left-right direction as a rotation axis on the display; or
visually turn the first search result card over by taking a central axis of the first search result card in an up-down direction as a rotation axis on the display.

13. The apparatus according to claim 9, wherein link information is recorded in a non-hot region on the first surface and/or the second surface of the first search result card, and the apparatus further comprises:
a jumping module configured to jump to a page indicated by the link information when the link information is clicked.

14. The apparatus according to claim 9, wherein each of the at least two search result cards is obtained by:
setting a search result card, in which the search result card is set to comprise the first surface and the second surface;
setting turning information for each of the first surface and the second surface, such that each of the first surface and the second surface has a turning property, and the first surface and the second surface are turned over synchronously on the display.

15. The apparatus according to claim 14, wherein the turning information comprises a first turning direction and a second turning direction, in which the first turning direction is a turning direction from the first surface to the second surface, the second turning direction is a turning angle from the second surface to the first surface, and the second turning direction is a same direction with the first turning direction or an opposite direction to the first turning direction.

16. The apparatus according to claim 14, wherein the turning information comprises a first turning speed and a second turning speed, in which the first turning speed is a turning speed from the first surface to the second surface and the second turning speed is a turning speed from the second surface to the first surface, and the first turning speed is identical with or different from the second turning speed.

* * * * *